United States Patent
Du et al.

(10) Patent No.: US 10,843,242 B2
(45) Date of Patent: Nov. 24, 2020

(54) REMEDIATION METHOD FOR DEGRADATION OF CADMIUM IN SOIL

(71) Applicant: Farmland Irrigation Research Institute, Chinese Academy of Agricultural Sciences, Xinxiang (CN)

(72) Inventors: Zhenjie Du, Xinxiang (CN); Yatao Xiao, Xinxiang (CN); Xuebin Qi, Xinxiang (CN); Liang Li, Xinxiang (CN); Bo Zhang, Xinxiang (CN); Ping Li, Xinxiang (CN); Zhijie Liang, Xinxiang (CN)

(73) Assignee: FARMLAND IRRIGATION RESEARCH INSTITUTE, CHINESE ACADEMY OF AGRICULTURAL SCIENCES, Xinxiang (CN)

( * ) Notice: Subject to any disclaimer, the term of this patent is extended or adjusted under 35 U.S.C. 154(b) by 0 days.

(21) Appl. No.: 16/750,359

(22) Filed: Jan. 23, 2020

(65) Prior Publication Data
US 2020/0298293 A1   Sep. 24, 2020

(30) Foreign Application Priority Data
Mar. 23, 2019 (CN) .......................... 2019 1 0224390

(51) Int. Cl.
*B09C 1/00* (2006.01)
*C09K 17/48* (2006.01)
(Continued)

(52) U.S. Cl.
CPC .............. *B09C 1/085* (2013.01); *B09C 1/105* (2013.01); *C09K 17/48* (2013.01); *C09K 2101/00* (2013.01)

(58) Field of Classification Search
CPC ......... B09C 1/085; B09C 1/105; C09K 17/18; C09K 2101/00
See application file for complete search history.

(56) References Cited

U.S. PATENT DOCUMENTS 5,098,538 A * 3/1992 Kim ...................... B01D 61/56
  204/157.15
5,458,747 A * 10/1995 Marks .................... B01D 61/42
  204/515
(Continued)

FOREIGN PATENT DOCUMENTS

CN   101745522 A  *  6/2010
CN   102049410 A  *  5/2011

*Primary Examiner* — Benjamin F Fiorello
(74) *Attorney, Agent, or Firm* — Wenderoth, Lind & Ponack, L.L.P.

(57) ABSTRACT

The present invention provides a remediation method for degradation of cadmium in soil. The specific steps are as follows: step 1, determining the content of cadmium in the soil; step 2, crushing and sieving soil from a soil surface, and weighing; step 3, wetting the soil, and removing part of cadmium in the soil to obtain semi-remediated soil; step 4, mixing the semi-remediated soil with a remediation agent, and allowing to stand to obtain improved soil; and step 5, planting *Bidens pilosa* in the improved soil, and when a growing season is finished, uprooting, and ashing to obtain finished soil. The present invention utilizes anode and cathodes and a remediation agent to treat the cadmium contaminated soil, and plants *Bidens pilosa* in the soil to achieve a joint effect of electrodynamic remediation, chemical remediation, microbial remediation and phytoremediation to remediate the cadmium contaminated soil.

10 Claims, 1 Drawing Sheet

(51) Int. Cl.
  *B09C 1/08* (2006.01)
  *B09C 1/10* (2006.01)
  *C09K 101/00* (2006.01)

(56) References Cited

U.S. PATENT DOCUMENTS

| | | | | | |
|---|---|---|---|---|---|
| 5,846,393 | A | * | 12/1998 | Clarke | B09C 1/005 |
| | | | | | 204/450 |
| 6,145,244 | A | * | 11/2000 | Hodko | A01B 47/00 |
| | | | | | 47/1.3 |
| 6,221,224 | B1 | * | 4/2001 | Hitchens | B01D 61/56 |
| | | | | | 204/515 |
| 2014/0360888 | A1 | * | 12/2014 | He | C02F 1/008 |
| | | | | | 205/743 |

* cited by examiner

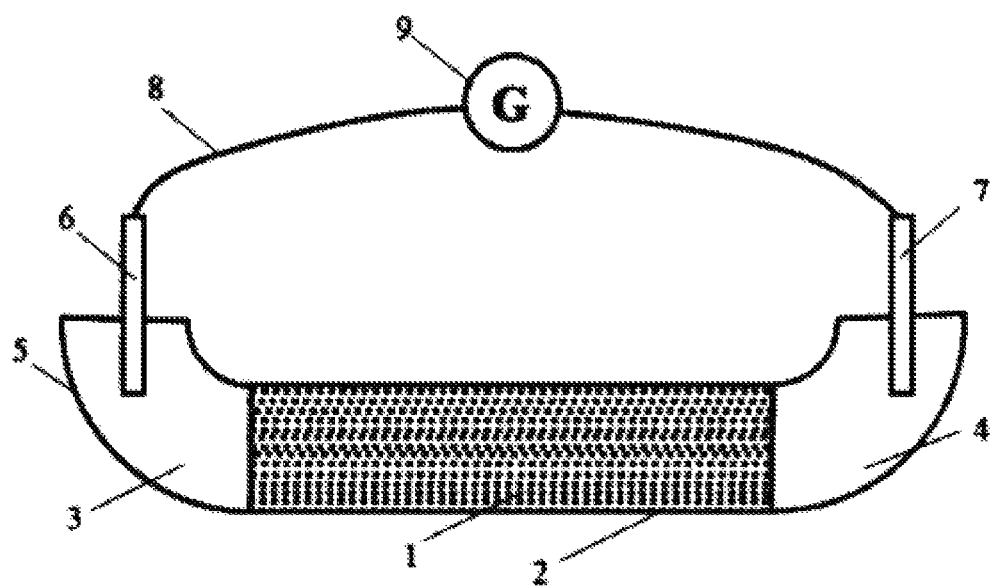

REMEDIATION METHOD FOR DEGRADATION OF CADMIUM IN SOIL

TECHNICAL FIELD

The present invention belongs to the technical field of contaminated soil remediation, and particularly relates to a remediation method for degradation of cadmium in soil.

BACKGROUND

With the increasingly serious global environmental damage, soil contamination has become the focus of research in all countries of the world, and heavy metals are considered to be one of the main contaminants in soil. At present, many rice producing areas in China have been found to have exceeded the standard of heavy metal cadmium, causing shock to the whole people. Cadmium has little mobility in soil. After entering the human body through a food chain, it is potentially harmful, which is not conducive to human health and social stability. The "cadmium rice crisis" has sounded the alarm of soil contamination.

Cadmium in contaminated soil has many forms, including an ion exchange form, a carbonate binding form, an organic binding form, an iron-manganese oxide binding form, and the like.

At present, the remediation techniques for heavy metal cadmium contamination mainly include physical remediation techniques, bioremediation techniques and chemical remediation techniques, among which the physical remediation techniques include vitrification techniques, heat treatment techniques, and electrodynamic remediation techniques, etc., and the physical remediation techniques mainly target cadmium in the forms of ion exchange, carbonate binding, and iron-manganese oxide binding; the bioremediation techniques include microbial remediation techniques, phytoremediation techniques, and plant curing techniques, etc., mainly targeting cadmium in the forms of ion exchange and organic binding; the chemical remediation techniques include soil leaching techniques, redox techniques, chemical dehalogenation techniques, and solvent extraction techniques, etc., mainly targeting cadmium in the forms of ion exchange and organic binding. These remediation techniques can only remove certain forms of cadmium in the soil and cannot remove multiple forms of cadmium present in the soil. When crops are planted in the soil, cadmium is still absorbed by the plants and enters the plants, animals and humans through a food chain, causing harm to human health.

SUMMARY

An objective of the present invention is to provide a remediation method for degradation of cadmium in soil, to solve the problem of the prior that only a single-form cadmium iron can be removed.

The technical solution of the present invention is: a remediation method for degradation of cadmium in soil, including the following steps:

step 1, determining the content of cadmium in the soil;

step 2, crushing and sieving 3-10 cm of soil from a surface of the cadmium contaminated soil, and removing a stone and a gravel for further use;

step 3, wetting the soil, and removing part of cadmium in the wetted soil to obtain semi-remediated soil;

step 4, adding a remediation agent to the semi-remediated soil, uniformly mixing, and allowing to stand for 48-72 h to obtain improved soil; and step 5, planting *Bidens pilosa* in the improved soil, and when a growing season of the *Bidens pilosa* is finished, uprooting the *Bidens pilosa*, and ashing to obtain remediated soil.

Preferably, the removing part of cadmium in step 3 is carried out by a reaction column; the reaction column is tubular, and two ends of the reaction column is are respectively snapped to two elbows; the two elbows are respectively provided therein with an anode and a cathode; the method of removing part of cadmium is to put to-be-remediated soil into a cavity of the reaction column, connect the anode and the cathode through a wire, the wire being provided thereon with a universal table, and operating for 30-36 d.

Preferably, the addition amount of the remediation agent is a weight ratio of the to-be-remediated soil to the remediation agent which is equal to 100:(0.7-1.5).

Preferably, the soil remediation agent includes 30-50 parts of nitrogen phosphorus and potassium fertilizer, 5-10 parts of complexing agent, 20-30 parts of fallen leaf, 25-35 parts of fly ash, 7-13 parts of *Bacillus*, 5-10 parts of *Streptomyces jingyangensis*, and 10-15 parts of rice koji.

Preferably, during operation, 0.2 mol/L of HCl is added around the anode and the cathode to infiltrate into the soil.

Preferably, the anode is an iron filing, and the cathode is activated carbon.

Preferably, the activated carbon is provided therein with a carbon rod, and the iron filing is provided therein with an iron rod.

Preferably, the complexing agent is sodium ethylenediamine tetracetate.

Preferably, the *Bacillus* is *Bacillus mucilaginosus* with a viable count ≥10 billion/g.

Preferably, the planting density of the *Bidens pilosa* is 5000 to 7000 plants per mu.

The present invention has the following beneficial effects.

The present invention provides a remediation method for degradation of cadmium in soil, which utilizes anode and cathodes and a remediation agent to treat cadmium contaminated soil, and plants *Bidens pilosa* in the soil to achieve a joint effect of electrodynamic remediation, chemical remediation, microbial remediation and phytoremediation to remediate the cadmium contaminated soil, thereby removing as many forms of cadmium as possible in the soil, and reducing the content of cadmium in the soil; the method has a good remediation effect, is easy to implement, saves a resource, and has high safety, and a broad application prospect.

BRIEF DESCRIPTION OF THE DRAWINGS

FIG. 1 is a schematic diagram of a galvanic cell for a remediation method for degradation of cadmium in soil provided by the present invention.

In the FIGURE: 1. to-be-remediated soil; 2. reaction column; 3. activated carbon; 4. iron filing; 5. elbow; 6. carbon rod; 7. iron rod; 8. wire; and 9. universal meter.

DETAILED DESCRIPTION

The specific implementations of the present invention are described in more detail with reference to the accompanying drawings.

Embodiment 1

A remediation method for degradation of cadmium in soil, including the following steps:

Step 1, take a sample of cadmium contaminated soil, and determine the content of cadmium in the soil sample.

Step 2, crush and sieve 10 cm of soil from a surface of the cadmium contaminated soil, remove a stone and a gravel for further use, and weigh to-be-remediated soil (1).

Step 3, wet the soil, that is, add water to the cadmium contaminated soil, stir uniformly, and then fill the wetted to-be-remediated soil (1) into a polyvinyl chloride (PVC) reaction column (2), where two ends of the PVC reaction column (2) are respectively snapped to activated carbon (3) and an iron filing (4) for communication; a lower end of a carbon rod (4) is inserted into the activated carbon (3), and an upper end of the carbon rod (6) is electrically connected to a universal meter (9) through a wire (8); a lower end of an iron rod (7) is inserted into the iron filing (4), and an upper end of the iron rod (7) is electrically connected to the universal meter (9) through the wire (8) (as shown in FIG. 1). In the process of running a galvanic cell, add 0.2 mol/L HCl to the activated carbon (3) and the iron filing (4), where the added HCl passes through a void of the activated carbon (3) and the iron filing (4), and penetrates into the soil; under the action of the galvanic cell, a redox reaction occurs; during the remediation of the soil by the cell, iron of the iron filing (4) is corroded and an electron is lost; an inert film generated by the iron corrosion covers the surface of the iron, causing anodic polarization to make the potential of the iron filing (4) more positive; the wire (8) transmits the electron to the carbon rod (6); the activated carbon (3) serves as a cathode of the galvanic cell; $H^+$ obtains the electron to discharge on the carbon rod (6); electrons of $O_2$ and $H_2O$ generate a hydroxide, and both $H^+$ and $O_2$ are gradually consumed; under a static condition, $O_2$ in the air hardly enters the soil, making the potential of the activated carbon (3) more negative; under the action of electromigration, ion-exchanged cadmium in the soil moves to the direction of the activated carbon (3), and iron-manganese oxide-bound cadmium in the soil moves to the direction of the activated carbon along the electromigration, and both are adsorbed by the activated carbon (3); the activated carbon (3) releases an appropriate amount of HCl, and the HCl is diffused into the soil; thus, carbonate-bound cadmium in the soil can be released, converted into ion-exchanged cadmium, and finally migrated to the direction of the activated carbon (3), and adsorbed by the activated carbon (3); at the same time, hydrochloric acid supplements a hydrogen to the cathode to continue the reaction, and an appropriate amount of hydrochloric acid is added to the iron filing (4) to neutralize an alkaline environment of the soil near the iron filing (4), so that the current of the galvanic cell increases, and the moving rate of a cadmium ion increases. After 30 d of stationary operation, take the treated soil out for further use, and obtain semi-remediated soil.

Step 4, add a soil remediation agent to the semi-remediated soil according to a weight ratio of the to-be-remediated soil to the remediation agent which is equal to 100:0.7, where the soil remediation agent includes 40 parts of nitrogen phosphorus and potassium fertilizer, 8 parts of sodium ethylenediamine tetracetate, 25 parts of fallen leaf, 29 parts of fly ash, 12 parts of *Bacillus mucilaginosus*, 8 parts of *Streptomyces jingyangensis*, and 14 parts of rice koji; a cell wall of the *Bacillus* contains a large amount of peptidoglycan and teichoic acid, thereby providing a large amount of active groups such as carboxylic acid and amide groups; these groups can lose a proton to generate a strong negative charge on the surface of a cell, so that the cell can adsorb ion-exchanged cadmium by electrostatic attraction; besides, during the process of growth and reproduction of the *Bacillus mucilaginosus*, organic acid, amino acid, and polysaccharide, etc. are generated, which can have a complex reaction with organically bound cadmium in the soil to form a more stable complex; the sodium ethylenediamine tetracetate, as a complexing agent, can form a more stable complex with a heavy metal cadmium ion, thereby increasing the solubility and mobility of the organically bound cadmium; the nitrogen phosphorus and potassium fertilizer is an inorganic fertilizer that can supplement the fertilizer efficiency of the soil; the *Streptomyces jingyangensis* can promote the decomposition of an organic matter in the soil to enhance the fertilizer efficiency of the soil; *Aspergillus oryzae* in the rice koji can decompose an organic matter in the fallen leaf into a nutrient needed for plant growth, thereby increasing the soil organic matter and improving the soil structure; the fly ash can promote the absorption of ion-exchanged cadmium by a plant, which turns waste into treasure. Uniformly mix the soil remediation agent with the soil, and allow to stand at 30° C. for 60 h to obtain improved soil.

Step 5, lay the improved soil at a position where the soil is taken, spread out the soil, plant *Bidens pilosa* in the improved soil, plant 6000 plants per acre, and water and fertilize, where the nitrogen phosphorus potassium fertilizer and other ingredients in the remediation agent can enhance the root growth of the *Bidens pilosa*, and a stable complex can pass through a cell membrane at the root of the *Bidens pilosa* to enter the body of the *Bidens pilosa*; a cadmium ion in the complex is transported to an aboveground part of the plant through transpiration of the plant, so that cadmium ions are enriched in the *Bidens pilosa*, and the biomass of the *Bidens pilosa* is increased; when the *Bidens pilosa* is mature, the *Bidens pilosa* is harvested with a root, and completely ashed to obtain finished soil after remediation.

Embodiment 2

The present embodiment differs from Embodiment 1 in that: the weight ratio of the to-be-remediated soil to the remediation agent in step 4 is 100:1.0.

Embodiment 3

The present embodiment differs from Embodiment 1 in that: the weight ratio of the to-be-remediated soil to the remediation agent in step 4 is 100:1.5.

A comparative example is to grow rice on soil that is not treated at all.

About half mu of rice was planted in Comparative Example 1 and in the remediated soil of Embodiments 1, 2 and 3. After maturity, 10 samples were taken from each test field, each sample weighing 1 kg, and the content of cadmium in each kilogram of rice was tested. The test data obtained is as follows:

| Embodiment | Average cadmium content (mg/kg) |
| --- | --- |
| Embodiment 1 | 0.32 |
| Embodiment 2 | 0.21 |
| Embodiment 3 | 0.15 |
| Comparative Example 1 | 0.47 |

According to the current national standard "National Food Safety Standard for Maximum Levels of Contaminants in Foods" (GB 2762-2012), a cadmium limit value for unhusked rice, brown rice and rice is 0.20 mg/kg, which shows that by the present invention, the rice grown in soil with mild cadmium contamination can meet the national food safety standard.

The present invention firstly disposes an anode and a cathode in the soil, and under an electrochemical action, the ion-exchanged, carbonate-bound and iron-manganese oxide-bound cadmium can be adsorbed by the cathode, achieving an effect of an electrodynamic remediation method.

After the addition of the remediation agent, the complexing agent in the remediation agent can form a more stable complex with the ion-exchanged cadmium and the organically bound cadmium, thereby increasing the mobility and solubility of the organically bound cadmium, improving the possibility of absorption by a plant, and achieving an effect of chemical fixation in a chemical remediation method.

At the same time, the *Bacillus mucilaginosus* in the remediation agent can degrade the ion-exchanged cadmium, and the *Streptomyces jingyangensis* and the rice koji can enhance soil fertility, thereby improving soil structure, promoting plant growth, absorbing ion-exchanged cadmium in the soil, and achieving an effect of a microbial remediation method for cadmium contaminated soil.

Finally, *Bidens pilosa* is planted in the soil, so that the complex and the ion-exchanged cadmium in the soil can be absorbed by the root of the *Bidens pilosa*, and enriched in the *Bidens pilosa*, thereby achieving the purpose of soil remediation and environment beautification, and achieving an effect of a phytoremediation method for cadmium contaminated soil.

The present invention provides a remediation method for degradation of cadmium in soil, which achieves a joint effect of electrodynamic remediation, chemical remediation, microbial remediation and phytoremediation to remediate the cadmium contaminated soil, thereby removing as many forms of cadmium as possible in the soil, and reducing the content of cadmium in the soil; the method has a good remediation effect, is easy to implement, saves a resource, and has high safety, and a broad application prospect.

What is claimed is:

1. A remediation method for degradation of cadmium in soil, comprising the following steps:
   step 1, determining the content of cadmium in the soil;
   step 2, crushing and sieving 3-10 cm of soil from a surface of the cadmium contaminated soil, and removing a stone and a gravel for further use;
   step 3, wetting the soil, and removing part of cadmium in the wetted soil to obtain semi-remediated soil;
   step 4, adding a remediation agent to the semi-remediated soil, uniformly mixing, and allowing to stand for 48-72 hours to obtain improved soil; and
   step 5, planting *Bidens pilosa* in the improved soil, and when a growing season of the *Bidens pilosa* is finished, uprooting the *Bidens pilosa*, and ashing to obtain remediated soil.

2. The remediation method for degradation of cadmium in soil according to claim 1, wherein the removing part of cadmium in step 3 is carried out by a reaction column (2); the reaction column (2) is tubular, and two ends of the reaction column is (2) are respectively snapped to two elbows (5); the two elbows (5) are respectively provided therein with an anode and a cathode; the method of removing part of cadmium is to put to-be-remediated soil (1) into a cavity of the reaction column (2), connect the anode and the cathode through a wire (8), the wire (8) being provided thereon with a universal table (9), and operating for 30-36 days.

3. The remediation method for degradation of cadmium in soil according to claim 2, wherein during operation, 0.2 mol/L of HCl is added around the anode and the cathode to infiltrate into the soil.

4. The remediation method for degradation of cadmium in soil according to claim 2, wherein the anode is an iron filing (4), and the cathode is activated carbon (3).

5. The remediation method for degradation of cadmium in soil according to claim 4, wherein the activated carbon (3) is provided therein with a carbon rod (6), and the iron filing (4) is provided therein with an iron rod (7).

6. The remediation method for degradation of cadmium in soil according to claim 1, wherein the addition amount of the remediation agent is a weight ratio of the to-be-remediated soil (1) to the remediation agent which ranges from 100:0.7 to 100:1.5.

7. The remediation method for degradation of cadmium in soil according to claim 1, wherein the soil remediation agent comprises 30-50 parts of nitrogen phosphorus and potassium fertilizer, 5-10 parts of complexing agent, 20-30 parts of fallen leaf, 25-35 parts of fly ash, 7-13 parts of *Bacillus*, 5-10 parts of *Streptomyces jingyangensis*, and 10-15 parts of rice koji.

8. The remediation method for degradation of cadmium in soil according to claim 7, wherein the complexing agent is sodium ethylenediamine tetracetate.

9. The remediation method for degradation of cadmium in soil according to claim 7, wherein the *Bacillus* is *Bacillus mucilaginosus* with a viable count ≥10 billion/g.

10. The remediation method for degradation of cadmium in soil according to claim 1, wherein the planting density of the *Bidens pilosa* is 5000 to 7000 plants per mu.

* * * * *